United States Patent
Armbruster et al.

(10) Patent No.: US 6,542,725 B2
(45) Date of Patent: *Apr. 1, 2003

(54) AMPLIFIER CIRCUIT ARRANGEMENT FOR ALTERNATIVELY PROCESSING A DIGITAL OR AN ANALOG SIGNAL

(75) Inventors: Veit Armbruster, St. Georgen (DE); Ali Dener, Dauchingen (DE); Helmut Hirt, Triberg (DE); Reinhard Sauter, Villingen-Schwenningen (DE)

(73) Assignee: Thomson Licensing S.A., Boulogne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/322,642

(22) Filed: May 28, 1999

(65) Prior Publication Data

US 2002/0098822 A1 Jul. 25, 2002

Related U.S. Application Data

(63) Continuation-in-part of application No. 08/850,101, filed on May 1, 1997, now abandoned.

(30) Foreign Application Priority Data

May 15, 1996 (DE) .......................................... 196 19 750

(51) Int. Cl.⁷ .............................. H04B 1/10; H04N 5/44
(52) U.S. Cl. ...................... 455/307; 455/553; 455/306; 455/266; 455/339; 348/725; 348/554
(58) Field of Search ................................ 455/266, 254, 455/552, 553, 234.1, 575, 306, 307, 338, 339, 341; 348/554, 555, 556, 558, 678, 705, 707, 731, 725

(56) References Cited

U.S. PATENT DOCUMENTS

| | | | |
|---|---|---|---|
| 5,283,653 A | 2/1994 | Citta | 348/725 |
| 5,561,406 A | 10/1996 | Ikata et al. | 333/126 |
| 5,584,056 A * | 12/1996 | Kim | 455/266 |
| 5,630,220 A * | 5/1997 | Yano | 455/339 |
| 5,793,799 A | 8/1998 | Armbruster et al. | 375/216 |
| 5,808,523 A | 9/1998 | Kobayashi et al. | 333/193 |
| 5,982,457 A * | 11/1999 | Limberg | 348/725 |
| 6,046,781 A * | 4/2000 | LeRoy | 348/725 |
| 6,061,096 A * | 5/2000 | Limberg | 348/725 |
| 6,108,044 A * | 8/2000 | Shin | 348/555 |
| 6,219,108 B1 * | 4/2001 | LeRoy | 348/725 |

FOREIGN PATENT DOCUMENTS

| | | | |
|---|---|---|---|
| DE | 4006059 | 9/1990 | ............ H04N/5/62 |
| DE | 4445002 | 6/1995 | .......... H03H/9/145 |
| DE | 19514798 | 1/1996 | ............ H03H/9/64 |
| EP | 0065150 | 11/1982 | ............ H04N/5/46 |
| EP | 0696854 | 2/1996 | ............ H04B/1/26 |
| GB | 2229877 | 10/1990 | ............ H04N/5/44 |
| JP | 7-255016 | 10/1995 | ............ H04N/5/44 |

OTHER PUBLICATIONS

Japanese Patent Office Patent Journal, Kokai Patent Application HEI 6–189220, published Jul. 8, 1994, with translation.
Japanese Patent Office Patent Journal, Kokai Patent Application HEI 6–205325, published Jul. 22, 1994, with translation.
German Search report dated Nov. 28, 1996.
Philips Semiconductors: "TDA9819 Multistandard vision and sound–IF PLL with DVB–IF processing". Data Sheet TDA9819, Integrated Circuits IC02, Product Specification, Jul. 14, 1998, pp. 1–227, XP002084575 European Search Report of Nov. 19, 1998.

* cited by examiner

*Primary Examiner*—William Trost
*Assistant Examiner*—Rafael Perez-Gutierrez
(74) *Attorney, Agent, or Firm*—Joseph S. Tripoli; Kuniyuki Akiyama

(57) ABSTRACT

According to the invention a digital signal path includes a first filter and an analog signal path includes a second filter. For analog reception both filters are connected in cascade, the first filter aiding the second filter in achieving a desired selectivity. Additional selection devices are obviated. Preferably the filters are surface acoustic wave filters.

11 Claims, 6 Drawing Sheets

AMPLIFIER CIRCUIT ARRANGEMENT FOR ALTERNATIVELY PROCESSING A DIGITAL OR AN ANALOG SIGNAL

This application is a continuation-in-part of U.S. patent application Ser. No. 08/850,101 filed May 1, 1997, now abandoned.

The invention is based on an amplifier circuit with filters for digital and analog signals, according to the precharacterizing clause of claim 1. Multistandard IF amplifiers (IF=intermediate frequency) are currently used for analog reception for various standards. The IF amplifier must select appropriate signals for each standard. Selection takes place in the IF range at a respectively fixed frequency. Filters are used for the selection. For analog reception, a Nyquist slope is required in order to obtain a suitable signal. This is not necessary for a digital signal.

Currently, if an analog and a digital signal are processed in a signal processing stage, then the corresponding analog or digital signal path is connected as a function of the received signal. A disadvantage with this is the relatively high outlay for analog signal processing.

It is an object of the invention to improve the selectivity of a filter in the path of the analog signal without the need of additional circuit means. This object is achieved by the features of the invention which are specified in claim 1. Advantageous developments of the invention are specified in the subclaims.

According to the invention, filters for digital and analog signals are employed. For analog signal reception, the filter for digital signal reception is connected into the path of the analog signal. By connecting the filter for the digital path upstream of the filter for the analog path, it is possible to do without selection means, for the analog signal, otherwise required in addition to the main selection. For digital signal reception, the filter of the analog path is not connected, since the digital signal requires the greatest possible bandwidth, whereas the filter of the analog path would limit the bandwidth. In order to decouple the filters for analog and digital signal processing, a decoupling stage is employed. The decoupling stage is preferably designed as an emitter follower. The filters for analog and digital signal processing are formed by surface acoustic ware filters because of their low costs. But also other types of filters can be employed like LC-filters. The filters are preferably arranged in a cascade circuit.

An advantage with an arrangement of this type is that the additional selection means used up to now in the analog signal processing path can be obviated. This additional selection is then carried out by the filter within the path of the digital signal.

A further advantage is that, for the surface acoustic wave filters, characteristics relating to amplitude frequency response and group delay time can be configured independently of one another. By virtue of the cascade circuit, a desired group delay time for the analog signal output can be configured more flexibly. This is possible by virtue of the superposition of the group delay times of the two filters. Ripples in the signal profile at the output of the surface acoustic wave filter in the path of the analog signal, which are otherwise unavoidable, can be compensated by the cascade circuit, by its signal profile being of opposite phase to the surface acoustic wave filter within the path of the digital signal. The desired group delay time profile of the surface acoustic wave filter in the analog path can be obtained by the appropriate profile of the surface acoustic wave filter in the digital path.

The invention is explained below with the aid of the drawings in which

FIGS. 3, 4, 4a, and 4b show developments of the amplifier circuit according to the invention.

Figure 1:
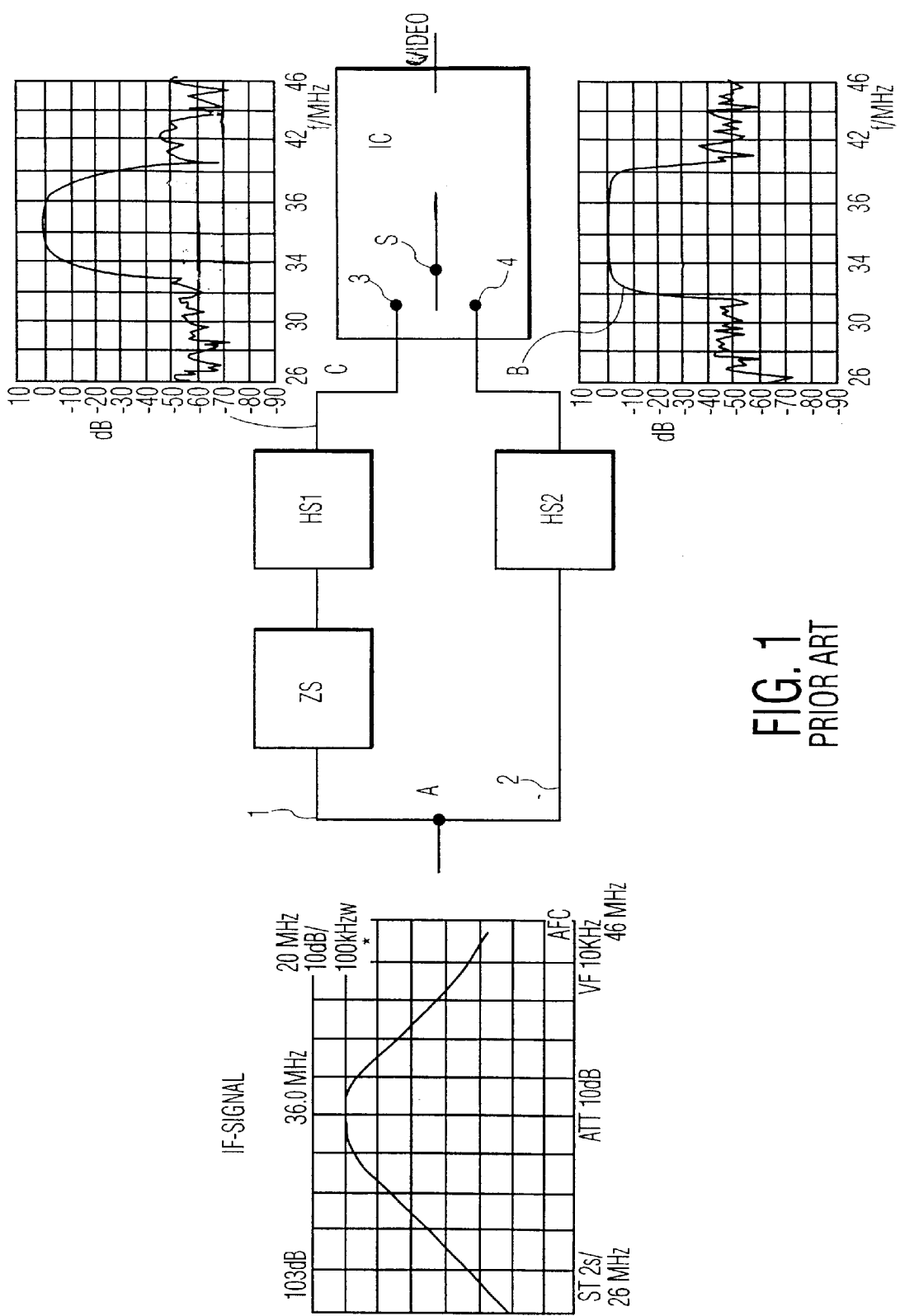
FIG. 1 shows a known amplifier circuit.

FIG. 1 shows a known amplifier circuit. The IF signal from the tuner (not represented here) enters the analog path 1 and the digital path 2 via the point A. The analog path 1 is formed by selection means ZS and the filter HS1. The digital path is formed by the filter HS2. The switch S of the signal processing stage IC connects through the signal for analog reception, switch position 3, or digital reception, switch position 4, for further processing in the signal processing stage IC. At point B, the signal resulting from the filter HS2 is represented. At point C, the signal resulting from the additional selection means ZS and the filter HS1 is represented.

Figure 2:
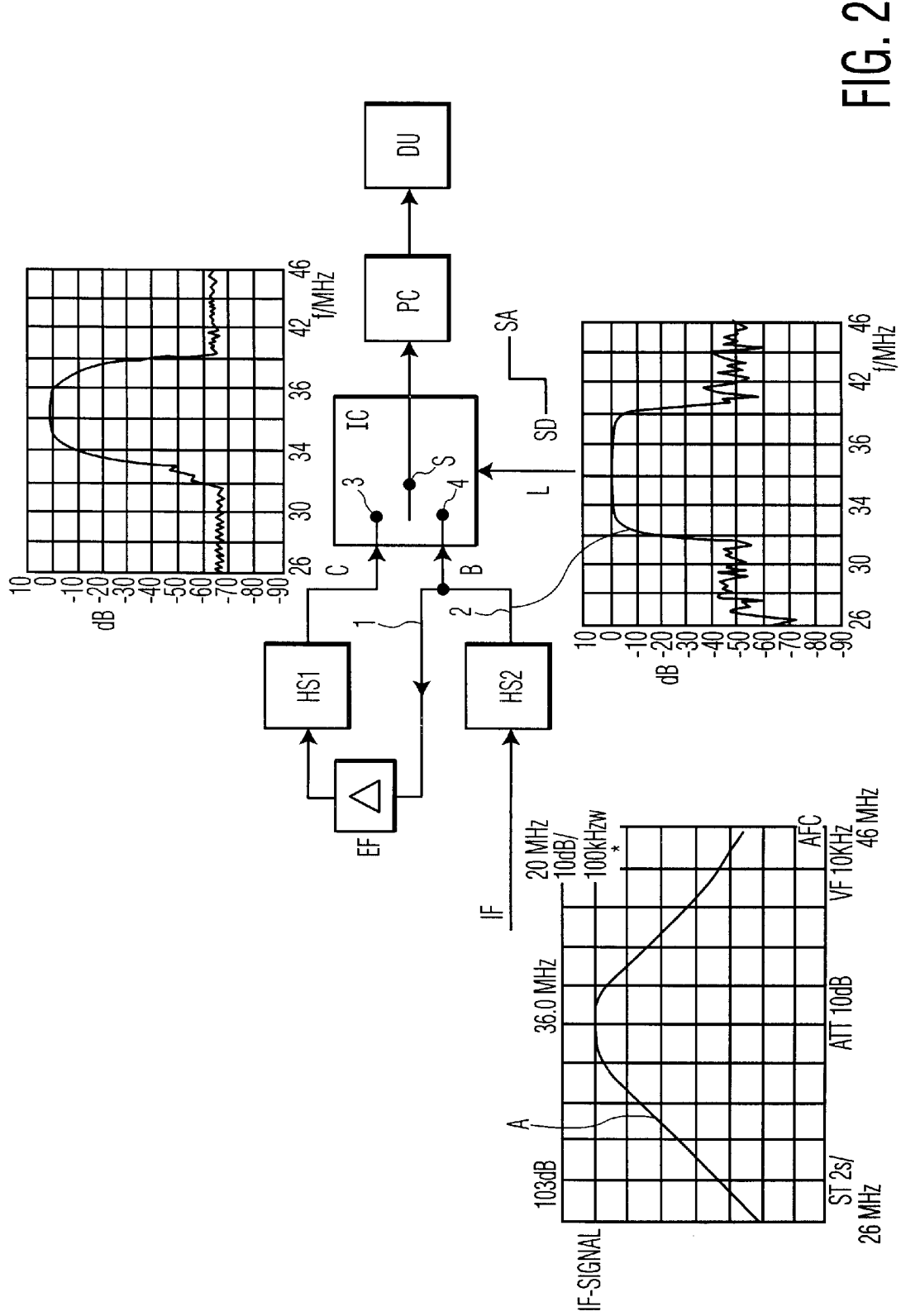
FIG. 2 shows an amplifier circuit according to the invention.

FIG. 2 shows the circuit arrangement according to the invention. The IF signal of the tuner (not represented here) reaches point B from point A via the surface acoustic wave filter HS2. From point B, the signal reaches the switching contact 4 of the switch S in the signal processing stage IC. From point B, the signal further continues via the emitter follower EF to the surface acoustic wave filter HS1. From the surface acoustic wave filter HS1 the signal reaches the switching contact 3 of the switch S via the point C.

As a function of the signal, the switch S switches to the switching contact 3 for analog signals, or to the switching contact 4 for digital signals. Switching to contact 4 is effected by a control voltage SD and switching to contact 3 is effected by a different control voltage SA, said control voltages being fed to a control input of switch S via a control lead L. Alternatively the switch S can be switched by the signal processing stage IC. It is possible for the signal processing stage IC to determine, on the one hand, whether a digital or an analog signal is received, and thus for the switch S to be switched as a function of the signal. It is also possible for the user, during preselection, to inform the signal processing stage IC definitively as to whether the received signal is intended to be analog or digital, and thereby, when the station number is later selected, the signal processing stage already knows that an analog or digital signal is received at this selected station number, and the switch is switched correspondingly into switch position 3 or 4. The output of switch is fed to a unit PC for further processing whose output is connected to a display unit DU for display of video signals or reproduction of audio signals.

The signal profile at point A and point B is unchanged with respect to FIG. 1. At point C, the signal profile is almost identical in comparison with point C in FIG. 1. The almost identical signal profile was sought according to the invention, so that, at the switching contact 3 of the switch, there is again a signal for the analog signal processing. By virtue of the cascade circuit of the two surface acoustic wave filters HS1 and HS2, an improved signal waveform can be seen at point C.

The omitted selection means ZS were used to suppress undesired signals such as adjacent carriers. The surface acoustic wave filter HS2 has a larger pass range than the surface acoustic wave filter HS1. As a result, the pass region of HS1 is not detrimentally affected. outside the pass range, however, inclusive of the adjacent carriers, an additional selection is achieved. The selection means ZS are thus no longer necessary, since, with the cascade circuit of the two surface acoustic wave filters HS2 and HS1, an overall selection is achieved which can be used for the analog signal processing.

Figure 3:
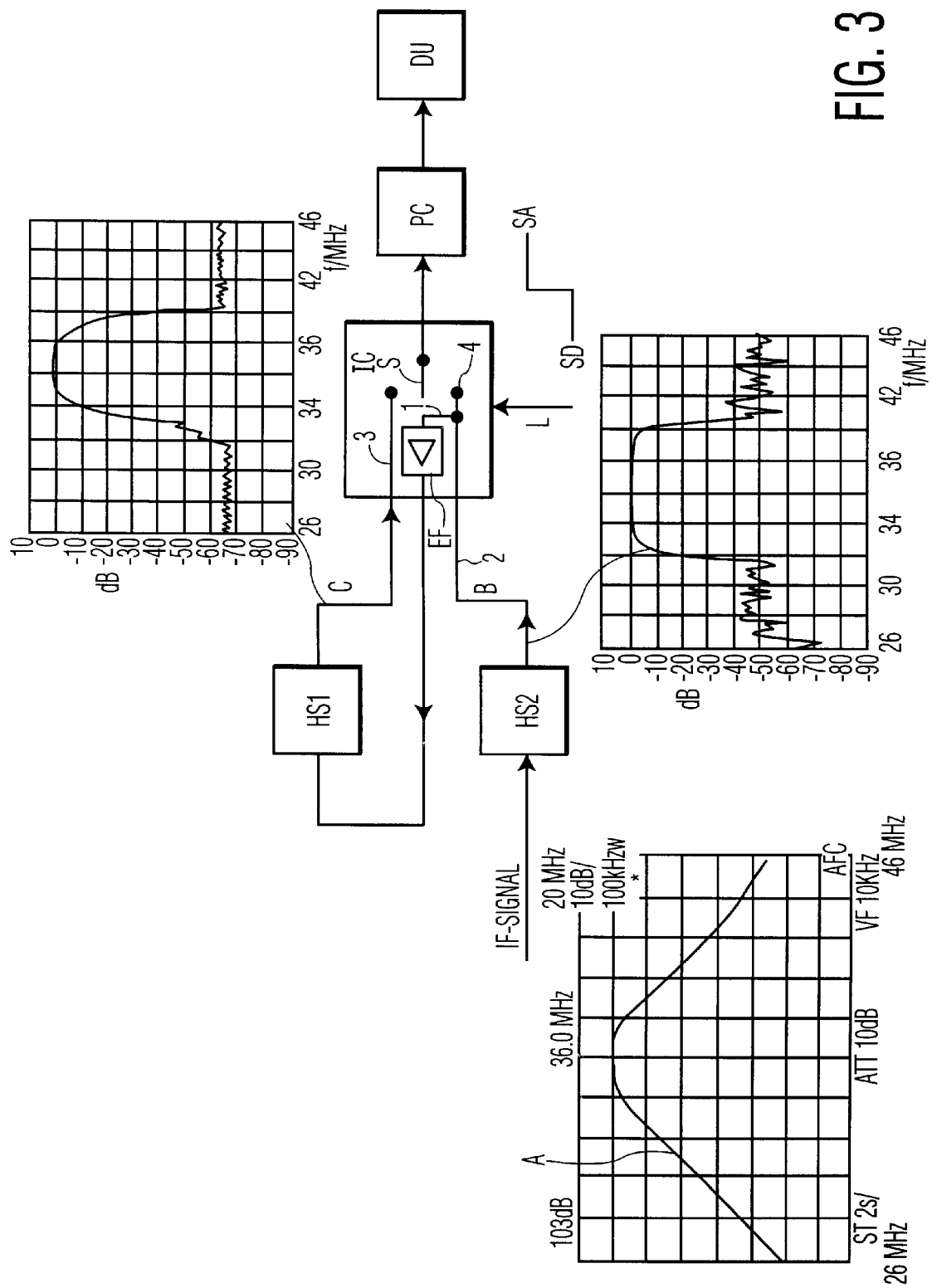

FIG. 3 shows a development of the solution according to the invention. The emitter follower EF has been integrated into the signal processing stage IC. In other regards, the circuit operates as described with reference to FIG. 2.

An advantage is that, with the surface acoustic wave filters HS1, HS2, characteristics relating to amplitude frequency response and group delay time can be configured independently of one another. By virtue of the cascade circuit, a desired group delay time at point C (FIGS. 2, 3) can be configured more flexibly by superposition of the group delay times in the surface acoustic wave filters HS1, HS2. Ripples in the surface acoustic wave filter HS1 which are otherwise unavoidable (signal profile, FIG. 1 point C) can be compensated by the cascade circuit by its profile being of opposite phase to the surface acoustic wave filter HS2 (FIGS. 2, 3 point C). The desired group delay time profile in the surface acoustic wave filter HS1 can be obtained by the appropriate profile of the surface acoustic wave filter HS2.

Figure 4:
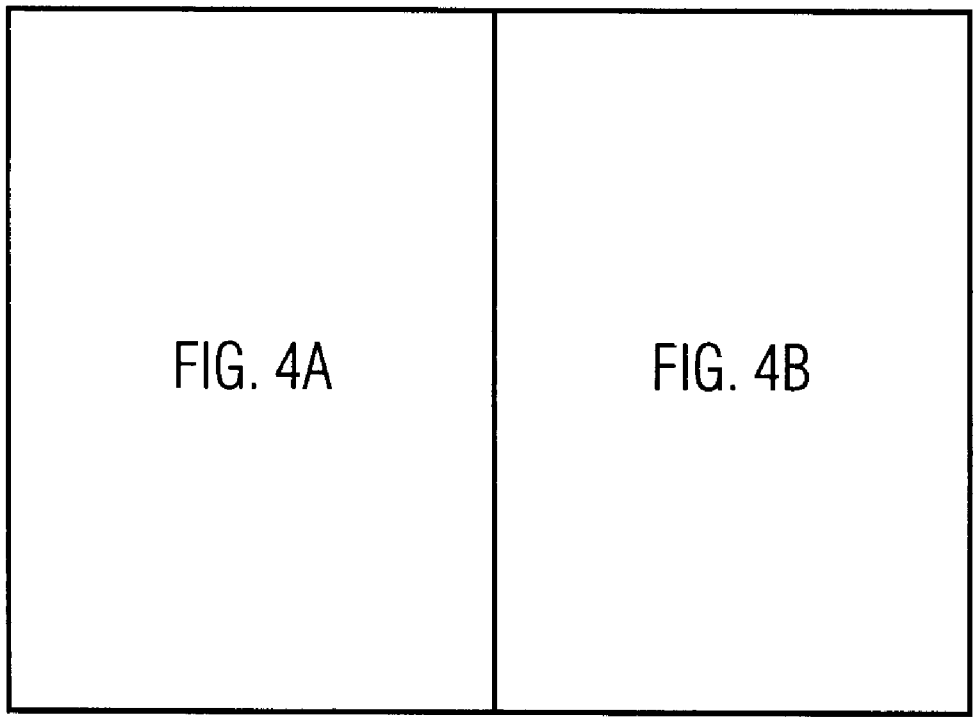
Figure 4A:
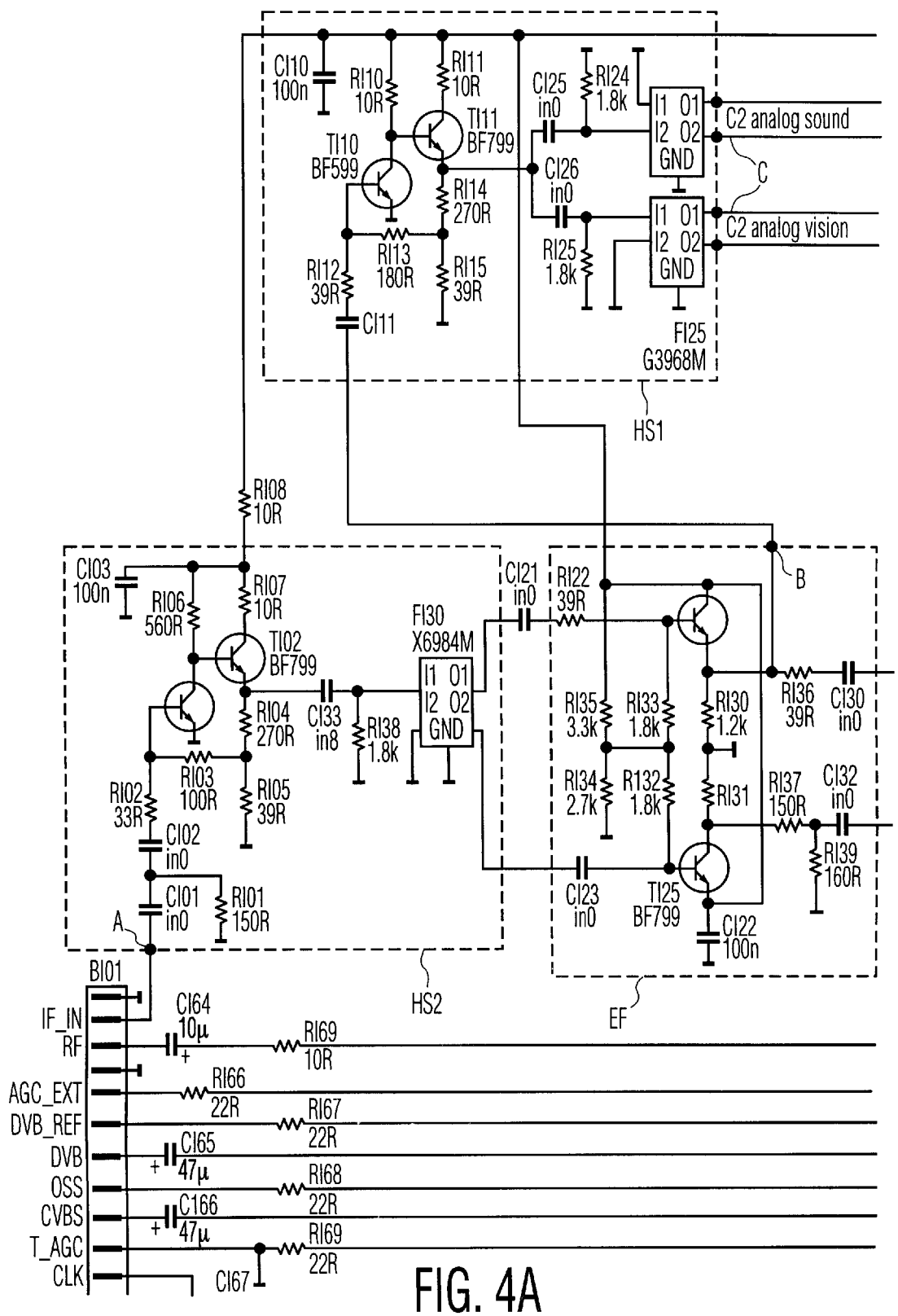
Figure 4B:
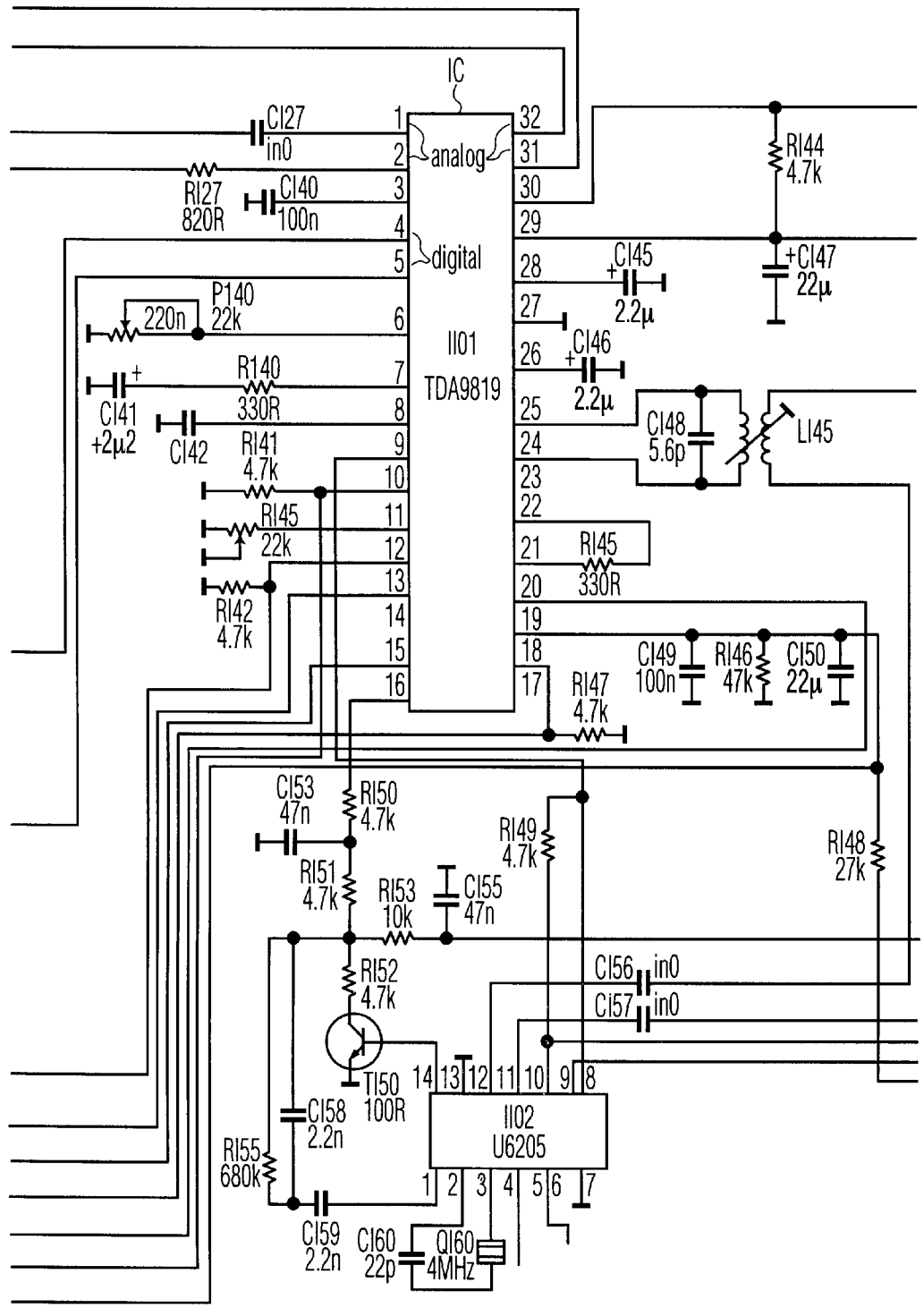

FIG. 4 shows a development of the circuit according to the invention. In the circuit diagram, the modules which were previously represented as blocks have been summarized and marked. The mode of operation and the interaction of the components have been explained with the aid of the block circuit diagrams. It can be seen clearly that there is only one signal input A. The surface acoustic wave filter HS2 for the digital signal path is located after this signal input A. The signal then reaches the emitter follower EF and, via pins 4 and 5, the integrated circuit IC. The measuring point B was, in the block circuit diagrams, upstream of the emitter follower, and the signal was also tapped upstream of the emitter follower. In this circuit layout, the signal is tapped after the emitter follower, so that these filters can then also be used for the digital part. The signal profile at point B is identical to the signal profile of the previous point B in FIGS. 2 and 3. After the emitter follower EF, the signal reaches the surface acoustic wave filter HS1. The analog path is divided into vision and sound, and characterized by the outputs C1 (analog vision) and C2 (analog sound). An advantage and difference with respect to FIGS. 2 and 3 is that the emitter follower EF is used both for the digital and for the analog part.

What is claimed is:

1. Amplifier circuit arrangement for alternatively processing a digital signal or an analog signal comprising:

an input terminal for receiving a digital signal or an analog signal, alternatively, a first channel for processing the digital signal, a second channel for processing the analog signal, a first filter connected between said input terminal and an input terminal of said first channel, an output terminal of said first filter being connected to an input terminal of a second filter so that said second filter receives signals without frequency conversion between said first filter and said second filter, said second filter having an output terminal being connected to an input terminal of said second channel, with the result that for reception of a digital signal only said first filter is used whereas for reception of the analog signal both filters are arranged in cascade and the selectivity characteristics of said second filter are improved by said first filter, said arrangement further comprising switching means having a first input terminal connected to the output terminal of said first filter and a second input terminal connected to the output terminal of said second filter and an output terminal connected to an input terminal of a signal path for further processing said digital signal or said analog signal, respectively, said switching means being controlled by a control voltage in such a way that the input of the signal path for further processing is connected to the output of said first filter during reception of digital signals and to the output of said second filter during reception of analog signals.

2. Amplifier circuit according to claim 1, wherein the control voltage is derived from a tuner having memory means for storing the channels to be received, said memory means including, for each channel, information indicating whether the stored channel transmits digital or analog signals.

3. Amplifier circuit according to claim 1, wherein the total amplitude frequency response profile is adjustable by the amplitude frequency response of the surface acoustic wave filters.

4. Amplifier circuit according to claim 1, wherein the total group delay time profile is adjustable by the group delay time of the surface acoustic wave filters.

5. Amplifier circuit according to claim 1, wherein a decoupling stage is provided between the output of said first filter and the input of said second filter.

6. Amplifier circuit according to claim 5, wherein said decoupling stage is incorporated within an integrated circuit.

7. Amplifier circuit according to claim 5, wherein said decoupling stage is formed by an emitter follower.

8. Amplifier circuit according to claim 1, wherein said first and/or second filter are/is formed by LC-filters including discrete inductances and capacitors.

9. Amplifier circuit according to claim 1, wherein said first and/or second filter are/is formed by surface acoustic wave filters.

10. Amplifier circuit according to claim 1, wherein said input digital or analog signal is an intermediate frequency (IF) signal.

11. Amplifier circuit according to claim 1, wherein the switching means are incorporated within an integrated circuit.

* * * * *